United States Patent [19]
Tsuji et al.

[11] Patent Number: 5,409,156
[45] Date of Patent: Apr. 25, 1995

[54] SPOT-WELDABLE ALUMINUM SHEET AND PRODUCTION THEREOF

[75] Inventors: Masanori Tsuji, Wakayama; Yoshihiko Hoboh, Osaka; Kazuyuki Fujita, Wakayama, all of Japan

[73] Assignee: Sumitomo Metal Industries, Ltd., Osaka, Japan

[21] Appl. No.: 897,039

[22] Filed: Jun. 11, 1992

[30] Foreign Application Priority Data

Jun. 19, 1991 [JP] Japan .................. 3-147405

[51] Int. Cl.⁶ .................................. C25D 11/04
[52] U.S. Cl. .................................. 228/120; 148/240; 148/269; 148/272; 148/275; 148/254; 148/285; 148/415; 219/121.63; 228/101; 428/457; 428/472
[58] Field of Search ............. 428/457, 472, 472.1; 228/101, 120; 148/240, 269, 272, 275, 284, 285, 415; 219/121 LD

[56] References Cited

U.S. PATENT DOCUMENTS

4,341,942 7/1982 Chaudhari et al. .......... 219/121 LD
4,353,951 10/1982 Yukitoshi et al. ................ 428/457

FOREIGN PATENT DOCUMENTS

0127343A1 12/1984 European Pat. Off. .
0131487B1 1/1985 European Pat. Off. .
0291277A1 11/1988 European Pat. Off. .
2705652A1 5/1978 Germany .
3545741A1 6/1987 Germany .
53-6252 1/1978 Japan .

OTHER PUBLICATIONS

J. Ruge, "Handbuch der Schweisstechnik Bd. II", 1980, Springer-Verlag, Berlin, Heidelberg, New York.

*Primary Examiner*—A. A. Turner

[57] ABSTRACT

An aluminum sheet for use in spot welding has an anodic oxide film with a thickness of 50 μm or less on at least one surface thereof. The anodic oxide film is preferably overlaid with a plating layer predominantly comprising at least one metal selected from the group consisting of Zn, Cr, Co, Ni, Fe, and Mn. The aluminum sheet can be produced by subjecting an aluminum or aluminum alloy sheet to anodic oxidation in an acidic solution having a pH of 4 or less conditions of from 2 to 200 V in voltage and from 0.2 to 200 seconds in duration, optionally followed by electroplating in an acidic plating bath.

8 Claims, 2 Drawing Sheets

SPOT-WELDABLE ALUMINUM SHEET AND PRODUCTION THEREOF

BACKGROUND OF THE INVENTION

This invention relates to a spot-weldable aluminum or aluminum alloy sheet which can be spot-welded with a decreased welding current over an increased number of weldable spots in continuous spot welding.

Because of a low specific weight of 2.7 (which is about one-third that of iron), aluminum sheet (which includes aluminum alloy sheet) has begun to be employed in some automobiles to constitute the whole bodies or parts of the bodies such as automobile hoods, for the purposes of saving weight and thereby reducing fuel consumption.

A major problem involved in the use of aluminum sheet in such applications is attributable to its spot weldability, which is significantly inferior to that of steel sheet conventionally used for automobile bodies.

Compared to steel, aluminum has significantly poorer heat generation efficiency in resistance welding such as spot welding since it is difficult to generate heat due to its low electrical resistivity, which is on the order of one-third to one-fourth that of steel, and the generated heat easily escapes due to its high thermal conductivity, which is on the order of 2 to 3 times that of steel. As a result, spot welding of aluminum sheets requires a current which is about four times as large as that required for spot welding of steel sheet. The following Table 1 shows the electrical and thermal conductivities of mild steel and 5000- and 6000-series aluminum alloys,

TABLE 1

|  | Electrical Conductivity[1] | Thermal Conductivity[2] |
|---|---|---|
| Mild Steel | 11–12% | 0.13–0.11 |
| 5000-series Al alloy | about 33% | about 0.28 |
| 6000-series Al alloy | about 45% | about 0.45 |

(Note):
[1] IACS%,
[2] cal/°C.cm.sec (at 20° C.)

Since a large current is passed in spot welding of aluminum sheets, as described above, between the aluminum sheets and the electrodes of a spot welder, which are usually made of Cu or a Cu alloy, the surface of the electrodes tends to be rapidly contaminated with aluminum to form a brittle Cu-Al alloy, As a result, the dressing life of the electrodes, which is expressed in terms of the number of weldable spots in continuous spot welding before dressing (regrinding) of the contaminated electrodes becomes necessary, is as small as between about 200 and about 300 spots, which is much smaller than the dressing life of 10,000 spots or more obtained with steel sheet, and this greatly interferes with the manufacture of automobile bodies from aluminum sheet. The dressing life or the number of weldable spots is an indication of continuous spot weldability, Thus, the spot weldability of aluminum sheet is significantly inferior to that of steel sheet, particularly with respect to the welding current required and the number of weldable spots in continuous welding.

In Japanese Patent Application Laid-Open No. 53-6252(1978) it is described that spot welding of aluminum sheet can be performed by interposing a thin zinc film between two aluminum sheets to be spot welded. The thin zinc film is either a zinc foil inserted in the interface between the two sheets or a zinc coating or plating formed on one or both of the aluminum sheets.

According to that method, it is expected that the efficiency of heat generation can be improved by the zinc film interposed between the aluminum sheets, resulting in a decrease in welding current. However, the improvement attained by the method depends on the thickness of the zinc film, and a sufficient effect cannot be obtained with a zinc film having a thickness of about 10 μm or less, which approximately corresponds to a weight of about 70 g/m² or less. On the other hand, the interposition of a Zn film thicker than 10 μm undesirably increases the manufacturing costs and decreases the adhesion of the film. When the film is a Zn plating, such a thick Zn plating on an aluminum sheet is often uneven and may cause flaking and powdering during press-forming of the plated aluminum sheet.

Furthermore, the above-described method does not modify the surface of the electrodes of a spot welder. Therefore, it cannot provide appreciable improvement in the continuous spot weldability (dressing life).

SUMMARY OF THE INVENTION

It is an object of this invention to improve the spot weldability of aluminum sheet with respect to welding current and continuous spot weldability.

A more specific object of the invention is to provide a spot weldable aluminum sheet suitable for use in automobile bodies which can be spot welded with a decreased welding current over an increased number of weldable spots in continuous spot welding before it becomes necessary to regrind the electrodes.

The present inventors have found that the spot weldability of an aluminum sheet is significantly improved, particularly with respect to a reduction in the welding current, by the formation of a very thin anodic oxide film on at least one surface of the aluminum sheet. The improvement is due to the heat generation efficiency of the oxide film which is higher than that of the aluminum sheet.

It has also been found that when the anodic oxide film is overlaid with a plating layer predominantly comprising at least one metal selected from the group consisting of Zn, Cr, Co, Ni, Fe, and Mn, the continuous spot weldability (the number of weldable spots in continuous spot welding) can be significantly improved. Such a plating layer has little tendency to contaminate the surface of the electrodes of a spot welder during spot welding, which is believed to be responsible at least partly for the improved spot weldability.

In general, the present invention provides an aluminum sheet for use in spot welding which has an anodic oxide film with a thickness of 50 μm or less on at least one surface thereof.

The aluminum sheet can be produced by subjecting an aluminum sheet to anodic oxidation in an acidic solution having a pH of 4 or less at a voltage of from 2 to 200 V and a duration of from 0.2 to 200 seconds.

In a preferred embodiment of the aluminum sheet according to the present invention, the anodic oxide film is overlaid with a plating layer predominantly comprising at least one metal selected from the group consisting of Zn, Cr, Co, Ni, Fe, and Mn.

Such an aluminum sheet can be produced by subjecting an aluminum sheet to anodic oxidation in an acidic solution having a pH of 4 or less at a voltage of from 2 to 200 V and a duration of from 0.2 to 200 seconds and then subjecting the oxidized sheet to electroplating in an acidic plating bath so as to form on the anodic oxide film a plating layer predominantly comprising at least one metal selected from the group consisting of Zn, Cr, Co, Ni, Fe, and Mn.

DESCRIPTION OF THE INVENTION

The present invention will now be described in further detail. In the following description, percents are by weight unless otherwise indicated.

The term "aluminum sheet" used herein encompasses not only aluminum metal sheets but also sheets of an aluminum alloy which comprises Al as the major alloying element. Examples of an aluminum alloy are Al-Mg (e.g., Al-4.5Mg), Al-Cu (e.g., Al-5Cu), Al-Cu-Si, Al-Mg-Si, and Al-Cu-Mg-Si. The aluminum sheet may be either cut sheet or in the form of coiled or uncoiled continuous strip.

According to the present invention, an aluminum sheet has an anodic oxide film on at least one surface thereof. The oxide film increases the contact resistance of the aluminum sheet and hence the heat generation efficiency thereof during spot welding.

Figure 1:
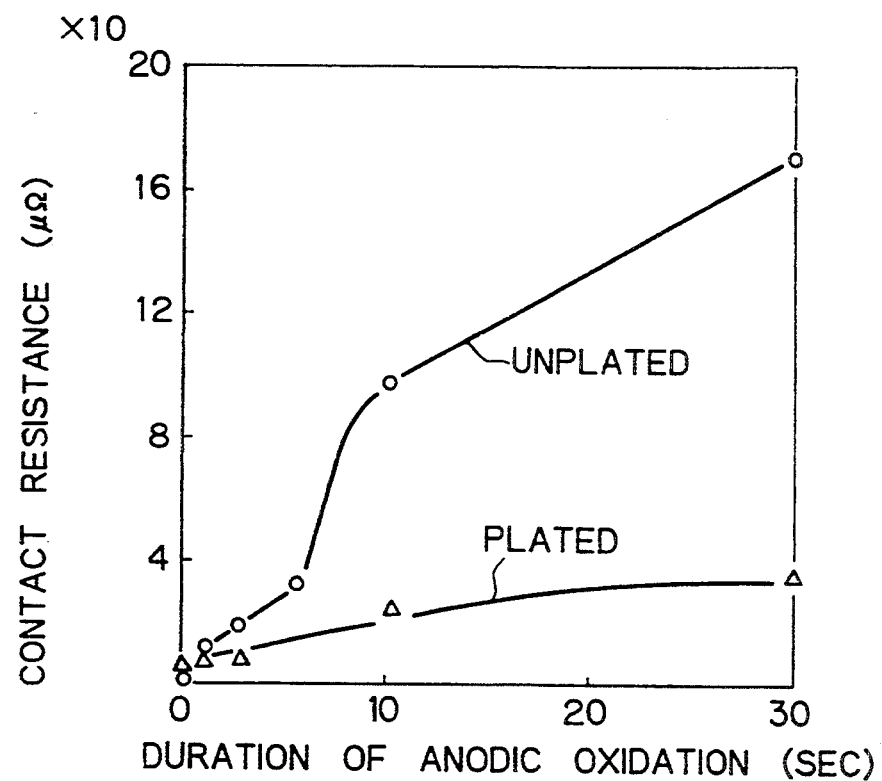
FIG. 1 is a graph showing the effect of the duration of anodizing treatment on the contact resistance of the resulting aluminum sheet.

FIG. 1 shows the contact resistance of an anodized aluminum sheet made of an Al-Mg alloy which is further plated with a Zn-Ni alloy plating layer (Δ) or unplated (O) as a function of duration of anodizing (anodic oxidation) treatment. It can be seen from this figure that the contact resistance of the aluminum sheet is increased as the duration of anodizing treatment, i.e., the thickness of the resulting anodic oxide film increases. Therefore, the formation of an anodic oxide film on the surface of an aluminum sheet results in an increase in the heat generation efficiency during spot welding, thereby making it possible to perform spot welding with a decreased welding current.

The anodic oxide film may be formed on at least one surface of an aluminum sheet by a method known per se, for example, in the following manner. [Pretreatment]

The aluminum sheet is pretreated in a conventional manner, e.g., by alkaline degreasing followed by pickling in order to clean the surface and remove the surface oxide film formed by oxidation with air. [Anodizing]

The pretreated aluminum sheet is then subjected to anodizing treatment in an acidic solution. The anodizing treatment is electrochemical oxidation occurring on the surface of an anode. The aluminum sheet is placed or passed as an anode in an electrolytic cell and is oxidized on the surface thereof with oxygen generated by electrolysis of water.

The conditions for anodizing treatment (voltage and duration) are selected so as to form an anodic oxide film having a thickness of 50 $\mu$m or less. It is preferred, particularly in those cases where the resulting oxide film is overlaid with a plating layer as described below, that the anodizing treatment be conducted at a voltage in the range of 2 to 200 V and preferably in the range of 5 to 50 V for a period of from 0.2 to 200 seconds and preferably from 1 to 30 seconds. If the voltage or duration of anodizing treatment exceeds the above-described maximum value, the resulting anodic oxide film has an excessively large thickness of greater than 50 $\mu$m, and such a thick oxide film makes it difficult during spot welding that the heat generated at the interface between an electrode of a spot welder and the oxide film or overlying plating layer on the aluminum sheet is transmitted to the aluminum substrate through the oxide film, thereby resulting in a decrease in weld strength.

Figure 2:
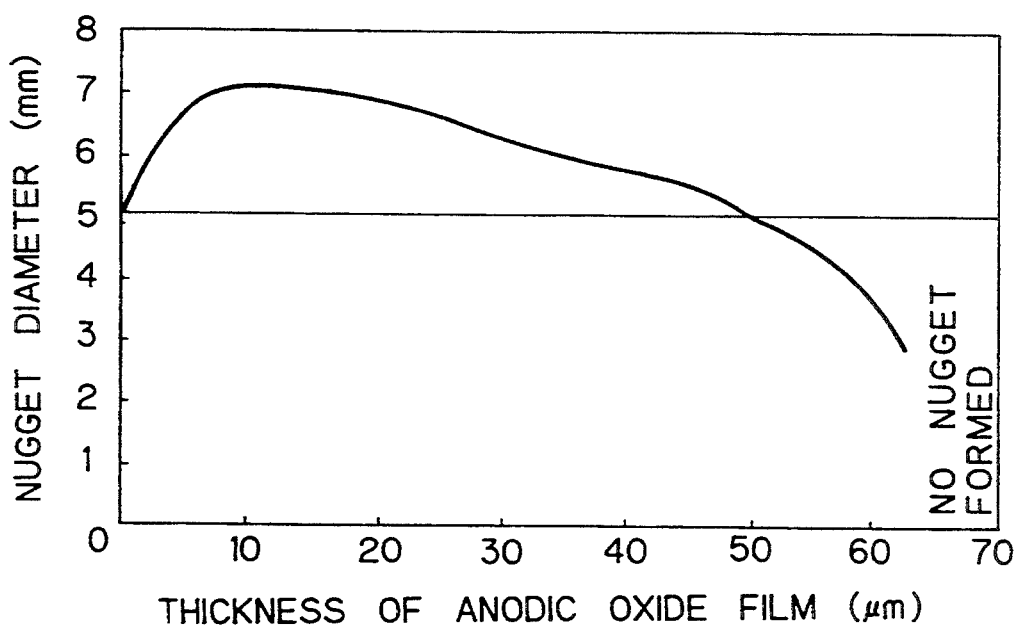
FIG. 2 is a graph showing the relationship between the nugget diameter and the thickness of the anodic oxide film of anodized aluminum sheets.

FIG. 2 is a graph showing the relationship between the nugget diameter (mm) and the thickness ($\mu$m) of the anodic oxide film of anodized aluminum sheets. It can be seen from the figure that a nugget having a diameter of 5 mm or greater can be formed when the anodic oxide film has a thickness of 50 $\mu$m or less.

A long duration of anodizing treatment is also disadvantageous since it requires an extended line when the anodized aluminum sheet is produced in a continuous process. The above-described duration of from 0.2 to 200 seconds employed in this invention is extremely shorter than that employed in the conventional anodizing of aluminum to form a corrosion-resistant oxide film known as "alumire", which is usually on the order of 10 minutes or longer. Therefore, the anodized and optionally plated aluminum sheet of the present invention can be produced in a continuous anodizing and plating line of a reasonable length.

The acid which constitutes the acidic solution used for anodizing may be selected from inorganic and organic acids including sulfuric acid, phosphoric acid, chromic acid, oxalic acid, sulfamic acid, and mixtures of these acids. For example, a mixed acid of sulfuric acid with a small amount of oxalic acid or sulfamic acid is preferred since it serves to improve the corrosion resistance of the aluminum sheet. It is desirable that the acidic solution have a pH of 4 or less in order to ensure that the desired anodic oxide film is formed steadily. Preferably, the pH of the acidic solution is from 1 to 2.

The thickness of the anodic oxide film is preferably 50 $\mu$m or less, more preferably in the range of from 0.1 to 30 $\mu$m, and most preferably in the range of 0.1 to 6 $\mu$m. An anodic oxide film thicker than 50 $\mu$m makes it difficult to transmit the heat to the aluminum substrate through the oxide film to an extent sufficient to attain good spot welding and also adds to the manufacturing costs.

The resulting anodic oxide film has a significantly lower electrical conductivity than pure aluminum or aluminum alloys and it generates heat more intensely during spot welding. Therefore, the heat generation efficiency, i.e., the quantity of heat generated per unit welding current of the anodized aluminum sheet is increased and the spot weldability of the anodized aluminum sheet is improved in that it can be spot welded with a decreased welding current.

In a preferred embodiment, the anodic oxide film on the aluminum substrate is overlaid with a plating layer predominantly comprising at least one metal selected from the group consisting of Zn, Cr, Co, Ni, Fe, and Mn. The plating layer preferably comprises a Zn alloy, Fe or Ni metal, or an Fe or Ni alloy. Since the anodic oxide film is harder than the aluminum substrate, it has better coatability by a plating layer, and the plating layer firmly adheres to the anodic oxide film.

The plating layer retards the deterioration of the surfaces of the tip electrodes of a spot welder. The deterioration of the electrodes, which are usually made of copper or a copper alloy such as a Cu-Cr alloy, is caused by a reaction of the electrode with the aluminum substrate during spot welding to form a brittle Cu-Al intermetallic compound. The plating layer serves as a barrier to prevent the aluminum sheet from contacting the electrodes and retard the deterioration of the electrodes. As a result, the dressing life of the electrodes is improved. In other words, the number of welded spots in continuous spot welding before the surface of the electrodes is deteriorated to such an extent that they must be reground or dressed is increased. The plating layer also serves to improve press-formability of the aluminum sheet. Moreover, the anodized and optionally plated aluminum sheet of the present invention has improved corrosion resistance sufficient to prevent fibriform corrosion.

Particularly when the plating layer is Ni, Co, or an Ni-or Co-containing alloy such as a Zn-Ni or Zn-Co alloy, Ni or Co slightly diffuses into the surface of the tip electrodes of a spot welder, thereby suppressing the deterioration of the tip electrodes caused by the formation of a brittle Cu-Al intermetallic compound effectively.

The plating layer on the anodic oxide film can be formed by subjecting the anodized aluminum sheet to electroplating in an acidic plating bath. The plating bath may be either a sulfate or chloride bath. The electroplating conditions are not critical and may be as follows, for example:

| | |
|---|---|
| pH: | 1.8 |
| Current Density: | 50 A/dm$^2$ |
| Temperature: | 55° C. |

Preferably, the resulting plating layer, which predominantly comprises at least one metal selected from the group consisting of Zn, Cr, Co, Ni, Fe, and Mn, has a coating weight of from 0.1 to 40 g/m$^2$ and more preferably from 5 to 30 g/m$^2$. A plating layer having a coating weight of less than 0.1 g/m$^2$ cannot cover the surface of the anodic oxide film sufficiently and it cannot prevent the deterioration of tip electrodes effectively. A plating layer having a coating weight of more than 40 g/m$^2$ significantly adds to the manufacturing costs. Since the plating layer has a relatively low coating weight, it does not affect press-formability of the aluminum sheet and does not cause powdering or flaking during press-forming.

Figure 3:
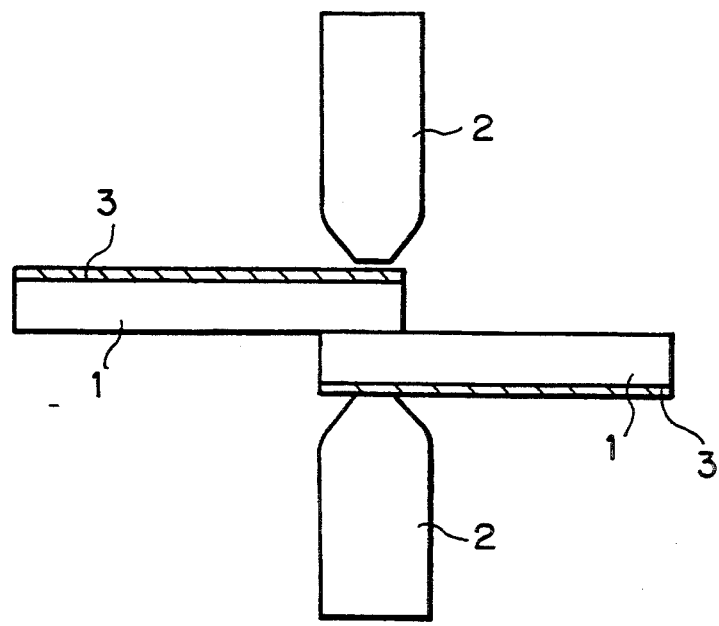
FIG. 3 schematically illustrates the manner of welding aluminum sheets of the present invention.

Spot welding of the aluminum sheet according to the present invention can be performed as shown in FIG. 3, in which ends of two aluminum sheets 1, 1 are superimposed and interposed between tip electrodes 2, 2 of a spot welder in such a manner that the anodized surface 3 of each aluminum sheet faces the electrode 2.

The following examples are given to further illustrate the invention.

EXAMPLE 1

A 1.0 mm-thick aluminum sheet made of an Al-4.5Mg alloy (GC45-0-LD, a 5000-series Al alloy) which is suitable for use in the manufacture of automobile hoods was subjected to pretreatment in the following sequence.

(1) Alkaline degreasing: cathodic electrolysis for 6 seconds in an aqueous 7% sodium orthosilicate solution at 50° C.
(2) Rinsing with water.
(3) Pickling: dipping for 5 seconds in an 8% hydrochloric acid solution (pH 1) 50° C.
(4) Rinsing with water.

The pretreated aluminum sheet was then subjected to anodic oxidation in an acidic solution under the conditions shown in Table 2 to form an anodic oxide film on both surfaces.

TABLE 2

| Run No. | Anodizing Voltage | Acidic Solution | Solution pH | Duration |
|---|---|---|---|---|
| 1* | — | — | — | — |
| 2 | 15 V | $H_2SO_4$ | 1.0 | 10 sec |
| 3 | 15 V | $H_2SO_4$ | 2.0 | 10 sec |
| 4 | 15 V | $(COOH)_2$ | 3.0 | 10 sec |
| 5 | 30 V | $H_2SO_4$ | 1.0 | 30 sec |
| 6 | 30 V | $H_2SO_4$ | 2.0 | 30 sec |
| 7 | 60 V | $H_2SO_4$ | 1.0 | 10 sec |
| 8 | 100 V | $H_2SO_4$ | 1.0 | 30 sec |

*Comparative Example

Figure 4:
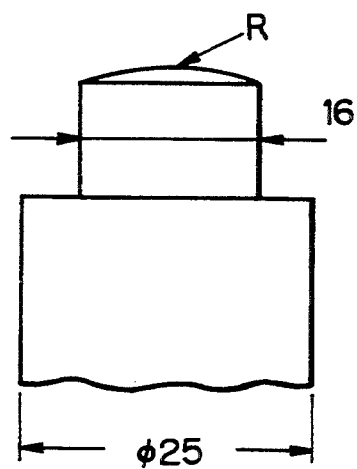
FIG. 4 is a schematic illustration of a cross section of the electrodes of a spot welder used in the Examples.

Each of the resulting anodized aluminum sheets of Runs Nos. 1 to 8 was tested for spot weldability by interposing two test pieces of the test aluminum sheet between the tip electrodes of a three-phase spot welder as shown in FIG. 3. Each tip electrode was made of a Cu-Cr alloy and had the cross-sectional shape shown in FIG. 4. The spot welding was performed at a frequency of 60 Hz for 5 cycles under a welding force of 500 kgf with varying welding current.

The values for welding current required to form a $5t^{\frac{1}{2}}$ nugget [which is a nugget having a diameter of $5t^{\frac{1}{2}}$, where t is the thickness in millimeters of the aluminum sheet (=1.0)] was determined for each test aluminum sheet. The results are shown in Table 3 along with the values for contact resistance and thickness of the anodic oxide film formed by the anodizing treatment.

TABLE 3

| Run No. | Contact Resistance | Current to form $5t^{\frac{1}{2}}$ nugget | Oxide Film Thickness | Remarks |
|---|---|---|---|---|
| 1 | 3 μΩ | 32 kA | —* | Compar. |
| 2 | 95 μΩ | 22.5 kA | 1 μm | Invent. |
| 3 | 88 μΩ | 24.5 kA | 1 μm | Invent. |
| 4 | 80 μΩ | 25 kA | 1 μm | Invent. |
| 5 | 105 μΩ | 23.0 kA | 15 μm | Invent. |
| 6 | 95 μΩ | 22.7 kA | 15 μm | Invent. |
| 7 | 120 μΩ | 22.0 kA | 10 μm | Invent. |
| 8 | 210 μΩ | 21.4 kA | 30 μm | Invent. |

*: Unmeasurable (approximately 0)
Compar. = Comparative;
Invent. = This Invention As is apparent from Table 3, the aluminum sheets according to the present invention had increased contact resistance, leading to an increase in heat generation efficiency. As a result, they showed decreased values for current required to form a $5t^{\frac{1}{2}}$ nugget.

EXAMPLE 2

An anodized aluminum sheet prepared in accordance with Run No. 2 of Example 1 was subjected to electroplating in a sulfate plating bath to form the plating layer shown in Table 4 on the anodic oxide film on each surface of the aluminum sheet.

TABLE 4

| Run No. | Anodizing | Plated Metal | Coating Weight |
|---|---|---|---|
| 1* | No | — | — |
| 2* | Yes | — | — |
| 3 | Yes | Zn-12% Ni | 15 g/m$^2$ |
| 4 | Yes | Zn-15% Fe | 15 g/m$^2$ |
| 5 | Yes | Fe-15% Zn | 15 g/m$^2$ |
| 6 | Yes | Zn-5% Co | 15 g/m$^2$ |
| 7 | Yes | Ni | 15 g/m$^2$ |
| 8 | Yes | Cr | 15 g/m$^2$ |
| 9 | Yes | Zn | 15 g/m$^2$ |
| 10 | Yes | Fe | 15 g/m$^2$ |
| 11 | Yes | Ni-15% Zn | 15 g/m$^2$ |
| 12 | Yes | Co-15% Zn | 15 g/m$^2$ |

*Comparative Example

The contact resistance of each plated aluminum sheet was measured. The spot weldability of the plated aluminum sheet was tested by performing spot welding in the same manner as described in Example 1 so as to determine the welding current required to form a 5t$^{\frac{1}{2}}$ nugget. In this example, the number of welded spots in continuous spot welding before regrinding of the tip electrodes became necessary was also determined for each test sheet by determining the number of welded spots formed before the tensile shear strength of a weld spot decreased to less than 200 kgf (=1960 N). The test results are shown in Table 5.

TABLE 5

| Run No. | Contact Resistance | Current to form 5t$^{\frac{1}{2}}$ nugget | Number of Welded Spots | Remarks |
|---|---|---|---|---|
| 1 | 3 μΩ | 32 kA | 250 | Compar. |
| 2 | 95 μΩ | 22.5 kA | 250 | Compar. |
| 3 | 25 μΩ | 19.0 kA | 2500 | Invent. |
| 4 | 27 μΩ | 19.9 kA | 1600 | Invent. |
| 5 | 30 μΩ | 20.0 kA | 2000 | Invent. |
| 6 | 22 μΩ | 18.5 kA | 2250 | Invent. |
| 7 | 23 μΩ | 19.2 kA | 2750 | Invent. |
| 8 | 28 μΩ | 20.0 kA | 2500 | Invent. |
| 9 | 25 μΩ | 20.2 kA | 1000 | Invent. |
| 10 | 28 μΩ | 21 kA | 2500 | Invent. |
| 11 | 20 μΩ | 19.1 kA | 3500 | Invent. |
| 12 | 21 μΩ | 19 kA | 3000 | Invent. |

Compar. = Comparative;
Invent. = This Invention

As can be seen from Table 5, the coating of the anodized aluminum sheet with a plating layer predominantly comprising at least one metal selected from the group consisting of Zn, Cr, Co, Ni, Fe, and Mn not only decreased the welding current but also significantly improved the continuous spot weldability.

The principles, preferred embodiments, and modes of operation of the present invention have been described above. The invention, however, is not to be construed as limited to the particular forms disclosed, since these are to be regarded as illustrative rather than restrictive. Variations and modifications may be made by those skilled in the art without departing from the concept of the invention.

What is claimed is:

1. A process of spot welding aluminum sheet, the process comprising steps of providing an aluminum sheet having an anodic oxide film on a surface of the aluminum sheet and a plating layer on the oxide film, contacting the plating layer of the aluminum sheet with a spot welding electrode and spot welding an opposite surface of the aluminum sheet to an object, the anodic oxide film having a thickness of 50 μm or less and the plating layer predominantly comprising at least one metal selected from the group consisting of Zn, Cr, Co, Ni, Fe, and Mn.

2. The process of claim 1, wherein the plating layer has a coating weight of from 0.1 to 40 g/m$^2$.

3. The process of claim 2, wherein the plating layer has a coating weight of from 5 to 30 g/m$^2$.

4. The process of claim 1, wherein the plating layer is made of Ni or Co metal or a Ni- or Co-containing alloy.

5. The process of claim 1, wherein the spot welding is performed continuously.

6. The process of claim 1, wherein the object comprises a second aluminum sheet having an anodic oxide film with a thickness of 50 μm or less on a surface of the second aluminum sheet in contact with a second spot welding electrode during the spot welding step.

7. The process of claim 1, wherein the opposite surface of the aluminum sheet includes an anodic oxide film with a thickness of 50 μm or less overlaid with a plating layer predominantly comprising at least one metal selected from the group consisting of Zn, Cr, Co, Ni, Fe and Mn.

8. The process of claim 6, wherein each surface of the second aluminum sheet includes an anodic oxide film with a thickness of 50 μm or less overlaid with a plating layer predominantly comprising at least one metal selected from the group consisting of Zn, Cr, Co, Ni, Fe and Mn.

* * * * *